J. M. DODGE.
CHAIN LINK.
APPLICATION FILED NOV. 14, 1914.

1,235,448.

Patented July 31, 1917.
2 SHEETS—SHEET 1.

Witnesses
Walter Thiem
Wilbur Simons

Inventor
James M. Dodge.
by his Attorneys
Howson & Howson

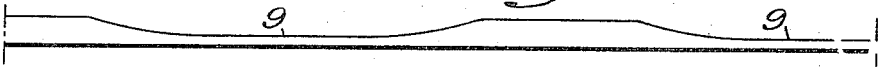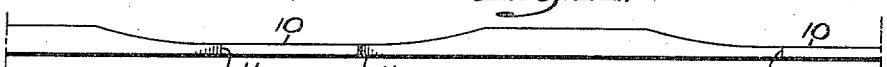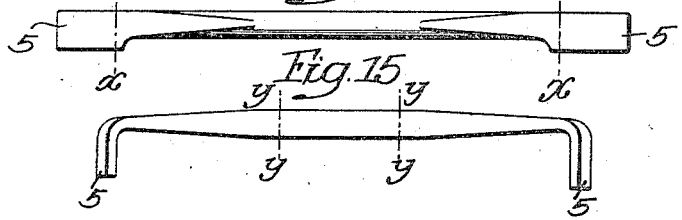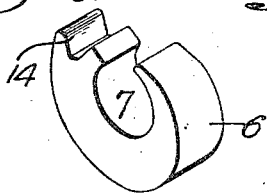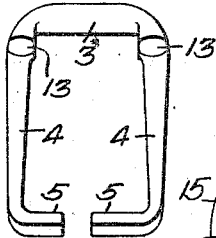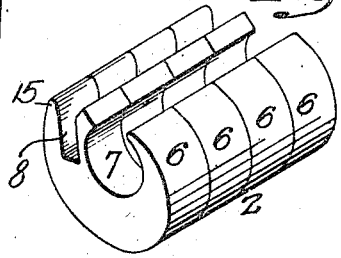

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

1,235,448.   Specification of Letters Patent.   Patented July 31, 1917.

Original application filed March 11, 1914, Serial No. 823,913. Divided and this application filed November 4, 1914. Serial No. 872,133.

*To all whom it may concern:*

Be it known that I, JAMES M. DODGE, a citizen of the United States, residing in Philadelphia, Pennsylvania, have invented certain Improvements in Chain-Links, (being a division of application filed March 11th, 1914, under Serial No. 823,913,) of which the following is a specification.

My invention relates to certain improvements in links of drive chains of the type having an open center for the reception of the teeth of a sprocket wheel and having a cross bar at one end and a hook at the opposite end for the reception of the bar of an adjoining link. The links are made detachable, one from the other, and are also made interchangeable.

This application is a companion application to one filed by me on the 8th day of February 1913, Serial No. 747,101, and also to one filed by Karl Dodge on the 8th day of February, 1913, Serial No. 747,135.

The object of my present invention is to improve the construction of a link of the type above described and to make the quadrangular body portion from a round bar, flattened and shaped so as to be readily united to the hook member by welding, in order to make a substantial link which will be a substitute for the present malleable iron link and which will be interchangeable therewith.

This object I attained in the following manner, reference being had to the accompanying drawings, in which:—

Figs. 8 and 9, are plan and side views, respectively, illustrating the first step in the process of forming the body portion by flattening a round bar;

Figs. 10 and 11, are views of the second step of the process, showing the cutting of the flattened portion;

Figs. 12 and 13, illustrate the third step in the process, in which the edges of the tapered and flattened portions are rounded and finished;

Fig. 14, is a view of one of the blanks cut from the bar;

Fig. 15, is a view showing the blank bent at each end;

Fig. 16, is a view showing the blank bent to form the quadrangular body portion;

Fig. 17, is a view of the finished body portion ready to have the hook members applied thereto, as in Fig. 7;

Fig. 18, is an enlarged perspective view of one of the hook elements showing the first step in the process of making the same;

Fig. 19, is an enlarged view of one of the hook elements showing the second step in the process of making the same; and Fig. 20, is a perspective view, showing the hook elements assembled to fit the body portion, as illustrated in Fig. 7.

Figure 6:
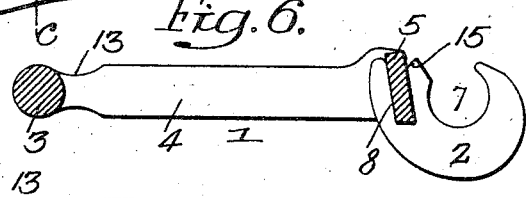
Fig. 6, is a longitudinal sectional view on the line *d—d*, Fig. 7, showing the body portion and the hook member assembled prior to welding.
Figure 7:
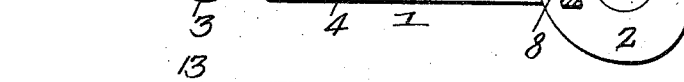
Fig. 7, is a plan view of the link prior to assembling.

Referring to the drawings, 1 is the body portion of the link made rectangular and having an open center into which the teeth of the sprocket wheel can project. This body portion is made from a round bar in the present instance, and is bent into shape to form the round end bar 3, tapered side bars 4, and the flat end members 5, Figs. 6, 7 and 17. The two end members 5, in the present instance, are preferably arranged to contact one with the other within the hook section 2, as illustrated in Fig. 7.

The hook section is made of a series of blanks 6, assembled side by side, and these blanks have a socket 7 for the reception of an end bar 3 of an adjoining link and are slotted at 8 directly back of the socket to receive the end members 5 of the body portion. When the two parts are assembled, they are secured together, preferably by welding, so as to make an integral link. The slot 8 in the hook member 2 is arranged at an angle, as clearly illustrated in Fig. 6, and the end member 5 of the body portion is also arranged at the same angle and these end members are of a greater depth than the balance of the body portion and preferably extend above the upper surface of the hook member, as in Fig. 6, to allow sufficient metal to make the proper weld. These members are flat and the slot 8 is comparatively narrow so as to decrease the distance between the front and rear of the hook member and yet to allow sufficient metal to make a firm union between the two parts.

It is essential, at the present time, that the link should interchange with an ordinary standard malleable link of the same size or number, and by making the link as above described it will interchange.

Figure 5:
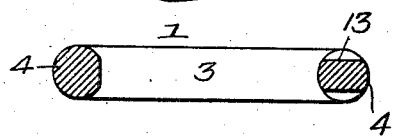
Fig. 5, is a transverse sectional view on the line *c—c*, Fig. 3.
Figure 3:
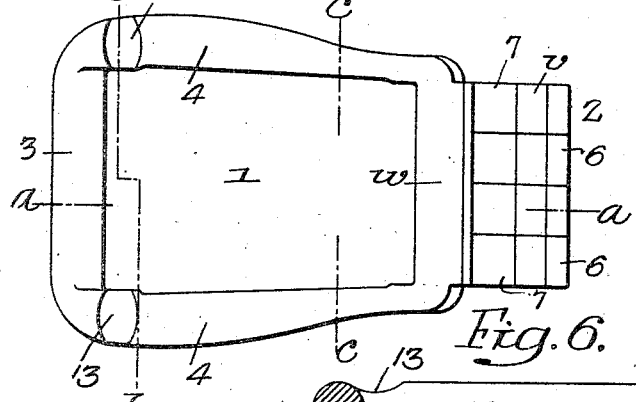
Fig. 3, is a plan view.

I make the blank for the body portion in the following manner:—A rod of a diameter to fit the socket member is flattened at intervals, as shown at 9, Figs. 8 and 9, so as to increase its width and to reduce its depth. Then this flattened portion is shaped by cutting away the depression on each side of a central projection 10, as illustrated in Figs. 10 and 11. This, however, leaves sharp corners at the edges 11 and 12. The blank is then placed in dies, which round the edges 11 and 12, as illustrated in Figs. 12 and 13. The blank is then in condition to be cut in the proper length, as illustrated in Fig. 14, and I preferably make the blanks so that one end member 5 will be of a greater length than the other member 5, so as to break joints with the sections of the hook member, as illustrated in Fig. 7. In this instance, there are four sections of the hook member, but, where the member is uneven, the ends 5 can be of the same length. The ends are then bent, as illustrated in Fig. 5, at the point $x$, $x$, Fig. 14, to form the end members, and are finally bent at $y$, $y$, Fig. 15, so as to form the tapered side members, as illustrated in Fig. 16. The blank is finally shaped in suitable dies so as to bring the ends of the end member 5 substantially in contact, as in Fig. 17, and to reduce any fins which might be formed on the body portion. At this step in the process the notches 13 are formed so that the links can be coupled by sliding the end bar into the socket of an adjoining link.

The blanks for the hook member 2 are punched from sheet metal and notched at the upper edge back of the socket 7, as at 14, Fig. 18. Then the blanks are assembled and cut by a suitable tool to form a deep slot 8, Fig. 19. The mouth of the slot is preferably enlarged by beveling the side walls, as shown at 15, Figs. 6 and 19, and as the end bar extends above the hook member it provides sufficient metal to properly make the slot. The weld is usually made by an acetylene flame and the excess metal of the hook member and the body portion is sufficient to make a proper weld, but it will be understood that additional metal may be added in some instances, without departing from the essential feature of the invention.

Figure 1:
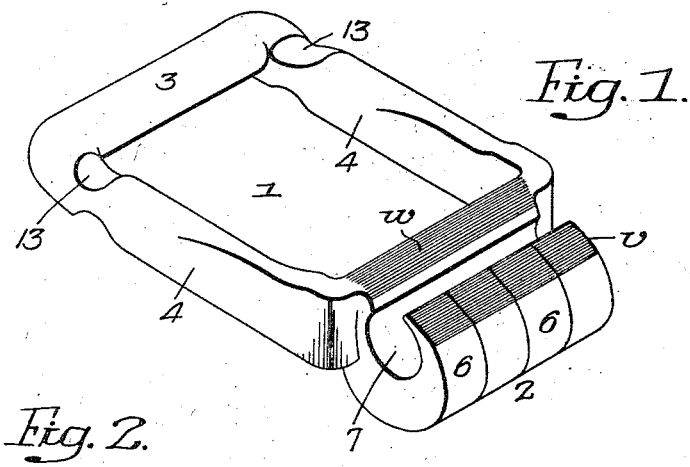
Figure 1, is a perspective view of my improved chain link.
Figure 2:
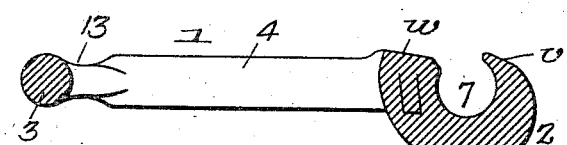
Fig. 2, is a longitudinal sectional view on the line *a—a*, Fig. 3.
Figure 4:
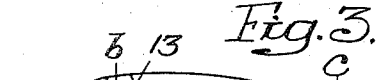
Fig. 4, is a transverse sectional view on the line *b—b*, Fig. 3.

The finished weld will have the appearance, as illustrated at $w$, Figs. 1 and 2, and an additional weld may be made as at $v$, Figs. 1 and 2, to unite the sections of the hook member together at the point of the hook.

A link made in accordance with my invention has been tested and compared with a malleable link of the same standard size, and it is stronger than the malleable iron link and can be manufactured at a less cost.

In this application I lay no claim to the process of making the described chain link, as said process is covered in the application for patent filed by me on March 11th, 1914, under Serial No. 823,913, of which this application is a division.

I claim:—

1. The combination in a chain link, of a substantially rectangular body portion comprising a round cross-bar at one end, flat members at the opposite end, the flat members being of less thickness and of greater width than the diameter of the round bar, and continuous side bars connecting the flat end members with the end cross bar, said side bars being circular in cross section adjacent the end cross bar and merging into a rectangular cross section adjacent the flat end members, and a hook member carried by the flat end members; said hook member having a transversely recessed socket for the reception of the round end bar of an adjoining link and an independent transverse slot back of the recessed socket receiving the flat end members of the body portion; said parts being secured together to form a unitary structure.

2. An open rectangular chain link comprising a round cross-bar at one end and a hook member at the opposite end adapted to receive the round cross-bar of an adjoining link, and side bars connecting the hook member with the round cross-bar, said side bars being circular in cross section adjacent the end bar and merging adjacent the hook member into a rectangular cross section having a width greater than the diameter of the round cross-bar.

In testimony whereof, I have signed my name to this specification, in the presence of two subscribing witnesses.

JAMES M. DODGE.

Witnesses:
 WM. A. BARR,
 JOS. H. KLEIN.